| United States Patent [19] | [11] | 4,064,056 |
| Walker et al. | [45] | Dec. 20, 1977 |

[54] DRILLING FLUIDS CONTAINING AN ADDITIVE COMPOSITION

[75] Inventors: Thad O. Walker, Houston; Clarence O. Walker, Richmond, both of Tex.

[73] Assignee: Texaco Inc., New York, N.Y.

[21] Appl. No.: 700,358

[22] Filed: June 28, 1976

[51] Int. Cl.² ............................................. C09K 7/02
[52] U.S. Cl. ............................. 252/8.5 C; 252/8.5 P
[58] Field of Search ......................... 252/8.5 C, 8.5 P

[56] References Cited

U.S. PATENT DOCUMENTS

| 3,214,374 | 10/1965 | Sample | 252/8.5 |
| 3,761,410 | 9/1973 | Mondshine et al. | 252/8.5 |
| 3,810,836 | 5/1974 | Norton | 252/8.5 |
| 3,840,460 | 10/1974 | Sheldahl et al. | 252/8.5 |
| 3,899,431 | 8/1975 | Hayes et al. | 252/8.5 |
| 3,981,998 | 9/1976 | Waldstein | 252/8.5 X |

*Primary Examiner*—Herbert B. Guynn
*Attorney, Agent, or Firm*—Thomas H. Whaley; Carl G. Ries; James F. Young

[57] ABSTRACT

Aqueous drilling fluids containing a minor amount of an additive composition. Such fluids are especially useful where reduced torque drilling fluids are needed. Another embodiment of this invention relates to a method of drilling utilizing the above-described fluids.

8 Claims, No Drawings

DRILLING FLUIDS CONTAINING AN ADDITIVE COMPOSITION

This invention relates to aqueous drilling fluids. More particularly, this invention relates to aqueous drilling fluids having incorporated therein a minor amount of an additive composition as hereinafter more fully described. In another embodiment this invention is directed to an improved drilling operation employing the modified drilling fluids described above.

In a drilling operation, such as in a rotary drilling operation, a drilling fluid is forced down the drill string, about the drill bit at the bottom of the borehole and then back up to the surface. The drilling fluid employed in such a drilling operation usually is an aqueous drilling fluid and is compounded of various materials in order to impart certain desirable physical and chemical properties to the drilling fluid. For example, there is usually incorporated in an aqueous drilling fluid a hydratable clayey material, such as a bentonite clay, to impart desirable viscosity and gel strength properties to the drilling fluid so as to better enable the drilling fluid to carry away the drilling cuttings from the bottom of the borehole. Other materials such as weighting agents, e.g., barium sulfate, are employed to increase the density of the drilling fluid so as to make the drilling operation more effective and safer by overcoming the fluid pressure within the formation being drilled. Other materials such as water loss improving agents, e.g., carboxymethycellulose, hydrolyzed starch, etc. are added to reduce the loss of fluid from the drilling fluid into the formation during the drilling operation. Still other materials such as corrosion inhibitors, bactericides and drill bit lubricants are incorporated in the drilling fluid in order to improve the drilling operation and the drilling fluid.

Although a wide variety of aqueous drilling fluids containing materials designed to increase the lubricity of these fluids have been proposed and used in the field, all of these modified drilling fluids suffer from one or more disadvantages.

In accordance with this invention an improved aqueous drilling fluid is provided by incorporating therein a minor amount of an additive composition hereinafter defined.

As used in the specification and in the accompanying claims, the expression "an additive composition" refers to an oil composition containing the following components on a calculated percentage composition basis: from about 13 to 15% of the sodium salts of petroleum sulfonic acids and rosin acids including 0 to 5% of naphthenic acids, as the emulsifying agent; from about 70 to about 82% of a petroleum oil carrier; from 0 to about 5% of a chlorinated paraffin hydrocarbon; from 0 to about 3.5% of ditertiaryalkyl polysulfide; from 0.5 to about 1% of tetraethylene oxide-nonyl phenol adduct; from 0.5 to about 1% of tri-isopropanolamine; from 0.5 to about 1% of ethylene glycol monobutyl ether; from 0 to about 1.1% of zinc dialkyl dithiophosphate; from 0.05 to 0.1% of hexahydro 1, 3, 5-triethyl-s-triazine; the balance being water; and wherein the chlorine and sulfur content of said additive composition each is from 0 to 1.82%.

A drilling fluid of this invention may be prepared by the addition of a minor amount of said additive composition described above to an aqueous drilling fluid or to an aqueous drilling fluid containing a clay dispersed therein. The amount of the additive composition added to the well drilling fluid may be only a minor but sufficient amount to substantially increase the lubricity of the said drilling fluid as measured, for example, by torque reduction. The amount to be added to the well drilling fluid is in the range of from about 2 to about 15 pounds thereof, per barrel of drilling fluid, preferably from about 4 to about 10 pounds per barrel and particularly preferred from about 5 to 8 pounds per barrel.

It has been found that the drilling fluids of the present invention exhibit a high degree of lubricity and little or no abnormal distortion of mud properties. Moveover the novel drilling fluids do not generate an abnormal amount of foam, so that any foaming can be controlled by the use of conventional defoamers which are compatible with drilling fluid systems. The novel drilling fluids of this invention show tolerance and stability over wide ranges in pH and electrolyte concentrations and they perform satisfactorily in the various mud systems (i.e. drilling fluid systems) in general use today, e.g. low and high pH, salt water, as well as nondispersed and inhibitive type mud systems.

The components of the additive composition of the present invention are admixed in a known manner such as by heating the petroleum oil fraction to a suitable elevated temperature, incorporating therein the emulsifying agent and the remaining components with stirring until a final product is obtained on cooling to room temperature.

The emulsifying agent component of the additive composition can be prepared by reacting caustic soda with (a) petroleum sulfonic acids having an average minimum molecular weight of 425; (b) gum rosin acids having an acid no. of at least 160 and a saponification no. of 166; (c) and optionally a naphthenic acid fraction obtained from a naphthenic crude oil, the distillate having a Viscosity, 100° F, of 75 S.U.S..

The petroleum oil component is a naphthenic oil blend obtained from a naphthenic distillate oil fraction having a Viscosity, 100° F, of 75 S.U.S, a refined naphthenic distillate oil fraction having a Viscosity, 210° F, of about 92; and a naphthenic pale oil having a Viscosity at 100° F of about 312.

The optional chlorinated paraffin hydrocarbon is a 40% chlorinated n-paraffin fraction used as a lubricity additive. The optional alkyl polysulfide component exhibits anti wear and Extreme Pressure properties. The polyethylene oxide-alkyl phenol adduct serves as a wetting agent and solubilizing agent. The tri isopropanol amine component serves as a corrosion inhibitor. The ether component functions as a solubilizing agent. The optional zinc dialkyldithio phosphate component serves for anti wear and antioxidant properties. The triazine component serves as a bactericde.

Following is description by way of example of suitable additive compositions of the present invention.

ADDITIVE COMPOSITION 1.

A composition containing the following components was prepared in a known manner, on a calculated weight basis 5.3% sodium sulfonic acids, 4.1% sodium rosin acids, 4.1% sodium naphthenic acids; 70.3% petroleum mineral oil including non-saponifiables; 4.5% chlorinated n-paraffin (40% chlorine content); 3.4% ditertiarynonyl polysulfide; 1.1% of zinc dialkyl dithiophosphate; 0.1% hexahydro 1, 3, 5 triethyl-s-triazine; 0.6% ethylene glycol monobutyl ether; 1.0% trisopropanol amine; 1.0% tetraethyleneoxide-nonyl phenol adduct; the balance (4.5%) water.

This composition had a calculated sulfur content of 1.81%, a chlorine content of 1.8%, a zinc content of 0.12%, a Viscosity, 130° F, of 298 S.U.S., and contained 14.5% of emulsifying agent.

ADDITIVE COMPOSITION 2.

Another composition containing the following components was prepared in a known manner on a calculated weight basis 7.7% sodium sulfonic acids; 5.2% sodium rosin acids; 81.4% petroleum mineral oil including non-saponifiables; 0.7% each of the same ether, adduct and amine components used in composition 1 above, 0.1% of the same triazine component and 3.5% water.

The composition had a Neut No. of 0.53 (alkaline), a Viscosity at 130° F. of 118 S.U.S., contained no S, Cl, Zn, or sodium naphthenic acids and contained 13.6% emulsifying agents.

An aqueous drilling fluid was used as the Base Mud. This mud was a top-hole mud from the West Cote Blanche Bay Field, St. Mary Parish, La., contained clay solids and was treated with 6 lbs/bbl of the ferrochrome lignosulfonate dispersant "Q-Broxin", its pH raised with caustic to 9.5, and aged overnight at 150° F. before use.

There was added to this Base Mud A varying amounts of the additive composition of the invention. The physical properties of the resultant drilling fluids are shown in Table I below.

Thereafter the additive composition was evaluated to determine its effectiveness as a lubricity additive composition using a lubricity test machine described hereinafter.

TEST PROCEDURE

A machine was designed to simulate borehole conditions. The torque on a steel shaft rotating in a formation type core in the presence of a circulating drilling fluid was measured.

The torque produced by dry friction is considered be linearly dependent on the normal force independent oy velocity area, and fluid properties such as plastic viscosity and yield point.

Viscous friction is caused by viscous drag of the shaft rotating in the circulating mud system. This type of drag is proportional to the surface area; velocity, and film thickness which together can be considered on the velocity gradient; and depends on fluid properties such as plastic viscosity and yield point. Viscous drag is dependent on the normal force only in an indirect manner through its effect on the film thickness. That is, increasing the normal force decreases the film thickness which in turn increases the velocity gradient thus increasing the required torque.

The major components of the test machine consist of a steel shaft turned by a cradle mounted motor with a Zero-Max (0–800 rpm) speed control, and a swivel mounted core. The motor was arranged so torque readings could be taken on a spring scale attached to the end of a lever arm.

The core is mounted on a bracket which pivots about a stationary point on one end. A cable is attached to the other end of the bracket. This cable runs over a pulley and weights are hung on the end. From a balance of moments and forces, the load on the pulley or applied load can be related to the load on the shaft or the normal force holding the shaft and core in contact.

The torque-load relation for the machine is linear. Thus the dry friction model adequately describes the process under consideration, and the change of the coefficient of friction between the base mud and the treated mud runs gives an indication of the lubricity effectiveness of the material under consideration.

The results obtained are reported as % reduction in torque.

The test results obtained were recorded and are summarized in the following Table II.

TABLE I

| Example | Additive | Concentration lbs/bbl | Drilling Fluid Rheology | | | API Water loss cc |
|---|---|---|---|---|---|---|
| | | | P.V. | Y.P. | pH | |
| Base Mud A* | — | | 16 | 1.5 | 10.5 | 8.0 |
| 1 | Additive Composition 1. | 2.5 | 18.5 | 3.0 | 10 | 5.2 |
| 2 | " | 5.0 | 20.5 | 7.5 | 10.1 | 5.2 |
| 3 | " | 7.5 | 25 | 10 | 10.1 | 4.4 |
| 4 | " | 10. | 21.5 | 12.5 | 10.1 | 3.6 |
| 5 | " | 15 | 27 | 16 | 10.1 | 3.2 |

Base Mud A* - a low pH aqueous drilling fluid as previously described with the pH at 10.5 instead of 9.5.

The data in the above Table I show that the additive compositions of the present invention are useful over a wide range of concentrations with no impairment of drilling fluid properties.

Using the Test Procedure described hereinabove, the effectiveness of the additive composition of the present invention was determined. For comparison, three commercial lubricity additive compositions were evaluated along with a diesel oil fraction alone. The test results are found in Table II.

TABLE II

| Example | Additive | Concentration lbs/bbl | % Reduction In Torque (after 60 mins) |
|---|---|---|---|
| 6 | Additive Composition 1. | 6 | 33.8 |
| 7 | Composition "W"* | 6 | +2.6 |
| 8 | Composition "X"** | 6 | 18.9 |
| 9 | Composition "Y"** | 6 | 36.8 |
| 10 | Composition "Z"** | 6 | 34.1 |

*Composition W is a refined diesel oil fraction.
**Compositions X, Y, and Z are commercially available proprietary materials conventionally used as E P and lubricity additives.

The data in the above Table II show that the additive composition is an effective lubricity additive in an aqueous drilling fluid. The torque measurements were taken one hour after the respective materials were added to Base Mud A to determine the lasting effects of the materials.

We claim:

1. An aqueous drilling fluid comprising an aqueous phase containing clay solids dispersed therein by a ferrochrome lignosulfonate dispersant and also containing an additive composition consisting essentially of an oil composition containing on a calculated weight percentage basis, from about 13 to 15% of the sodium salts of petroleum sulfonic acids having an average minimum molecular weight of 425 and gum rosin acids having an acid no. of at least 160 and a saponification no. of 166, and including from 0 to 5% of a naphthenic acid fraction obtained from a naphthenic crude oil, the distillate having a Viscosity, 100° F., of 75 S.U.S., as emulsifying agent, from about 70 to about 82% of a mineral oil carrier, consisting of a naphthenic oil blend obtained from a naphthenic distillate oil fraction having a Viscosity, 100° F. of 75 S.U.S., a refined naphthenic distillate oil fraction having a Viscosity, 210° F. of about 92 S.U.S., and a naphthenic pale oil having a Viscosity, 100° F. of about 312 S.U.S., from 0 to about 5% of a chlorinated n- paraffin hydrocarbon containing about 40% chlorine, from 0 to about 3.5% of ditertiary nonyl polysulfide, from 0.5 to about 1% of a tetraethylene oxide-nonyl phenol adduct, from 0.5 to about 1% of tri-isopropanolamine, from 0.5 to about 1% of ethylene glycol monobutyl ether, from 0 to about 1.1% of zinc dialkyl dithiophosphate, from 0.05 to 0.1% of hexahydro 1,3,5 triethyl-s-triazine, the balance being water and wherein the chlorine content and sulfur content of said additive composition each is from 0 to 1.82%, said additive composition being present in said drilling fluid in an amount of from about 2 to about 15 pounds per barrel.

2. An aqueous drilling fluid as claimed in claim 1 wherein said additive composition is present in said aqueous phase in an amount of from about 4 to about 10 pounds per barrel.

3. An aqueous drilling fluid as claimed in claim 1 wherein said additive composition is present in said aqueous phase in an amount of from about 5 to about 8 pounds per barrel.

4. An aqueous drilling fluid as claimed in claim 1 wherein said drilling fluid is a low pH drilling fluid having a pH of from about 9.5 to about 10.5

5. In a method of drilling wells wherein an drilling fluid is circulated through the well in contact with an earth formation during the drilling operation, the improvement which comprises contacting said earth formation with an aqueous drilling fluid containing clay solids dispersed therein by a ferrochrome lignosulfonate dispersant and also containing in the aqueous phase an additive composition consisting essentially of an oil composition containing on a calculated weight percentage basis, from about 13 to 15% of the sodium salts of petroleum sulfonic acids having an average minimum molecular weight of 425 and gum rosin acids having an acid no. of at least 160 and a saponification no. of 166, and including from 0 to 5% of a naphthenic acid fraction obtained from a naphthenic crude oil, the distillate having a Viscosity, 100° F., of 75 S.U.S., as emulsifying agent, from about 70 to about 82% of a mineral oil carrier, consisting of a naphthenic oil blend obtained from a naphthenic distillate oil fraction having a Viscosity, 100° F. of 75 S.U.S., a refined naphthenic distillate oil fraction having a Viscosity, 210° F. of about 92 S.U.S., and a naphthenic pale oil having a Viscosity, 100° F. of about 312 S.U.S., from 0 to about 5% of a chlorinated n-paraffin hydrocarbon containing about 40% chlorine, from 0 to about 3.5% of ditertiary nonyl polysulfide, from 0.5 to about 1% of a tetraethylene oxide-nonyl phenol adduct, from 0.5 to about 1% of tri-isopropanolamine, from 0.5 to about 1% of ethylene glycol monobutyl ether, from 0 to about 1.1% of zinc dialkyl dithiophosphate, from 0.05 to 0.01% of hexahydro 1,3,5 triethyl-s-triazine, the balance being water and wherein the chlorine content and sulfur content of said additive composition each is from 0 to 1.82%, said additive composition being present in said drilling fluid in an amount of from about 2 to about 15 pounds per barrel.

6. A method as claimed in claim 5 wherein said additive composition is present in said aqueous phase in an amount of from about 4 to about 10 pounds per barrel.

7. A method claimed in claim 5 wherein said additive composition is present in said aqueous phase in an amount of from about 5 to about 8 pounds per barrel.

8. A method as claimed in claim 5 wherein said drilling fluid is a low pH drilling fluid having as pH of from about 9.5 to about 10.5.

* * * * *

UNITED STATES PATENT AND TRADEMARK OFFICE
CERTIFICATE OF CORRECTION

PATENT NO. : 4,064,056
DATED : December 20, 1977
INVENTOR(S) : Thad O. Walker and Clarence O. Walker It is certified that error appears in the above–identified patent and that said Letters Patent are hereby corrected as shown below:

Col. 6, line 21 delete "0.01%" and insert -- 0.1% --.

Signed and Sealed this

Thirty-first Day of October 1978

[SEAL]

Attest:

RUTH C. MASON
*Attesting Officer*

DONALD W. BANNER
*Commissioner of Patents and Trademarks*